US007583305B2

(12) United States Patent
McDermott

(10) Patent No.: US 7,583,305 B2
(45) Date of Patent: Sep. 1, 2009

(54) EXTENDED DYNAMIC RANGE IMAGING SYSTEM

(75) Inventor: Bruce C. McDermott, Penfield, NY (US)

(73) Assignee: Eastman Kodak Company, Rochester, NY (US)

( * ) Notice: Subject to any disclaimer, the term of this patent is extended or adjusted under 35 U.S.C. 154(b) by 702 days.

(21) Appl. No.: 10/887,071

(22) Filed: Jul. 7, 2004

(65) Prior Publication Data
US 2006/0007498 A1 Jan. 12, 2006

(51) Int. Cl.
H04N 5/235 (2006.01)
H04N 5/335 (2006.01)
G03B 3/00 (2006.01)

(52) U.S. Cl. ............... 348/297; 348/221.1; 348/362; 396/96

(58) Field of Classification Search .......... 348/229.1, 348/362, 297, 296, 220.1, 221.1, 222.1, 223.1, 348/224.1, 230.1, 294, 295, 298, 345, 349, 348/353, 354, 355, 356, 363, 364, 365, 302, 348/308; 358/443, 482, 208.1
See application file for complete search history.

(56) References Cited

U.S. PATENT DOCUMENTS

| 4,734,582 | A |   | 3/1988 | Gibbons et al. |
| 4,862,276 | A |   | 8/1989 | Wang et al. |
| 6,008,486 | A |   | 12/1999 | Stam et al. |
| 6,069,352 | A | * | 5/2000 | Castracane et al. .... 250/214 VT |
| 6,606,121 | B1 |   | 8/2003 | Markus et al. |
| 6,665,010 | B1 | * | 12/2003 | Morris et al. ............. 348/297 |
| 6,765,619 | B1 | * | 7/2004 | Deng et al. ............... 348/362 |
| 6,831,695 | B1 | * | 12/2004 | Tamayama ................ 348/362 |
| 6,906,745 | B1 | * | 6/2005 | Fossum et al. ........... 348/229.1 |
| 7,158,180 | B2 | * | 1/2007 | Neidrich .................. 348/340 |
| 2002/0176010 | A1 | * | 11/2002 | Wallach et al. .......... 348/229.1 |

FOREIGN PATENT DOCUMENTS

EP           1 096 789 A2    2/2001

OTHER PUBLICATIONS

U.S. Appl. No. 10/654,313, filed Sep. 3, 2004, Robert M. Guidash

* cited by examiner

Primary Examiner—David L Ometz
Assistant Examiner—Peter Chon
(74) Attorney, Agent, or Firm—Stephen H. Shaw

(57) ABSTRACT

A method for decreasing integration time of saturated paxels within an imager; wherein the method includes decreasing the integration time of the saturated paxels within an imager according to scene data from a captured image.

9 Claims, 5 Drawing Sheets

EXTENDED DYNAMIC RANGE IMAGING SYSTEM

FIELD OF THE INVENTION

The present invention relates generally to the field of imaging, and in particular to imaging using an electronic imager with pixel address based programmable integration time.

BACKGROUND OF THE INVENTION

Imagers, particularly CMOS imagers, in the past have had problems with scenes that have a high dynamic range such that parts of the scene have highlights therein. This is termed scene exposure latitude. In these highlighted portions of the image, the pixels of the sensor become saturated, such that the digital pixel outputs are all 1's. Accordingly, the pixels of the sensor are especially saturated when the captured scene contains more dynamic range than typically can be captured; for example, a couple standing in the park with the sun over their shoulder. The normal scene can have a dynamic range of 6 to 7 stops. The image of the sun introduces another 10 stops of dynamic range. Current state of the art cameras set the exposure level to capture the couple and allow the sun to saturate the image in the resultant picture. Similar circumstances exist with images that contain specular reflections, for example, the sun reflecting off a metallic car bumper. One other exemplary troublesome scene to capture contains a car in a parking lot, at night. To expose the car correctly, the car headlights and the streetlights illuminating the parking lot will ultimately saturate the image. Consequently, for conventional imaging systems, very little error in determining exposure can be tolerated when the scene dynamic range is close to, or equal to the dynamic range of the image capture system.

What is needed is an image capture system that always has a dynamic range greater than the captured scene.

SUMMARY OF THE INVENTION

The aforementioned need is addressed by the present invention by providing a method for decreasing integration time of saturated paxels within an imager; wherein the method includes decreasing the integration time of the saturated paxels within an imager according to scene data from a captured image. Another aspect of the present invention provides for an electronic image capture system that includes an imager that enables independent integration time control of paxels and an algorithm for determining the correct integration time for the paxels based on their saturation level.

ADVANTAGEOUS EFFECT OF THE INVENTION

Through multiple image captures, the integration time of the paxels is adjusted to reach the ideal compromise between scene dynamic range and captured scene signal to noise ratio.

The present invention will correct the problems sited and result in a system with greater scene exposure latitude. Hence, the present invention will result in an image capture system having the capability to capture more of the scene's dynamic range.

DETAILED DESCRIPTION OF THE INVENTION

In the following description, the present invention will be described in the preferred embodiment as utilizing a microprocessor as a controller and also executing the paxel integration time algorithm. Those skilled in the art will readily recognize that the equivalent of this system may also be constructed in hardware only.

The present invention determines the geographic locations of the bright or highlight areas of an image. An adaptive exposure algorithm, employed by the present invention, decreases the integration time of the paxels in the highlight areas of the image so that these paxels are exposed correctly, i.e., close to, but not at saturation. In this way, one can capture a scene that has higher dynamic range than what could be captured using conventional methods. The additional dynamic range is the dynamic range captured by the paxels with reduced integration time. This invention takes advantage of the ability to program the integration time of paxels within an imager independently of each other as described in further detail in U.S. Ser. No. 10/654,313 filed on 3 Sep. 2003 in the name of Robert M. Guidash, and incorporated herein by reference.

To solve the dynamic range problem, in an exemplary embodiment, the present invention employs CMOS imaging sensors that enable individual, pixel level, programming of integration time, based on the pixel X-Y address. In a single exposure it is possible to have alternate rows of pixels with varying integration time. It is also possible to group pixels in small X-Y groups. These small X-Y groups are termed paxels. The X-Y size of these paxels can be dynamically changed. Typically, these paxels are based on the color filter array pattern used to detect different colors in the image. For example, the Bayer color filter array pattern (CFA) has a Green-Red alternate on the first line with a Blue-Green alternate on the next line. This CFA pattern is repeated for all lines in the imager. One may set alternate rows of the imager with significantly different integration times. The present invention utilizes blocks of pixels, i.e., paxels in the same way. Some blocks may have long integration times, some may have short integration times.

In one embodiment of the present invention, scene data as captured by an imager is analyzed and assessed for saturation in a paxel by paxel basis. The imager may be an imager with an individual X-Y addressable integration time. Herein, integration time is defined as the amount of time that the imager is allowed to absorb an image during the capture process. For the present invention, the integration time of only the saturated paxels is decreased. Additional images are repeatedly captured, analyzed, and assessed under different integration times, until the number of saturated paxels is nearly zero.

Figure 1:
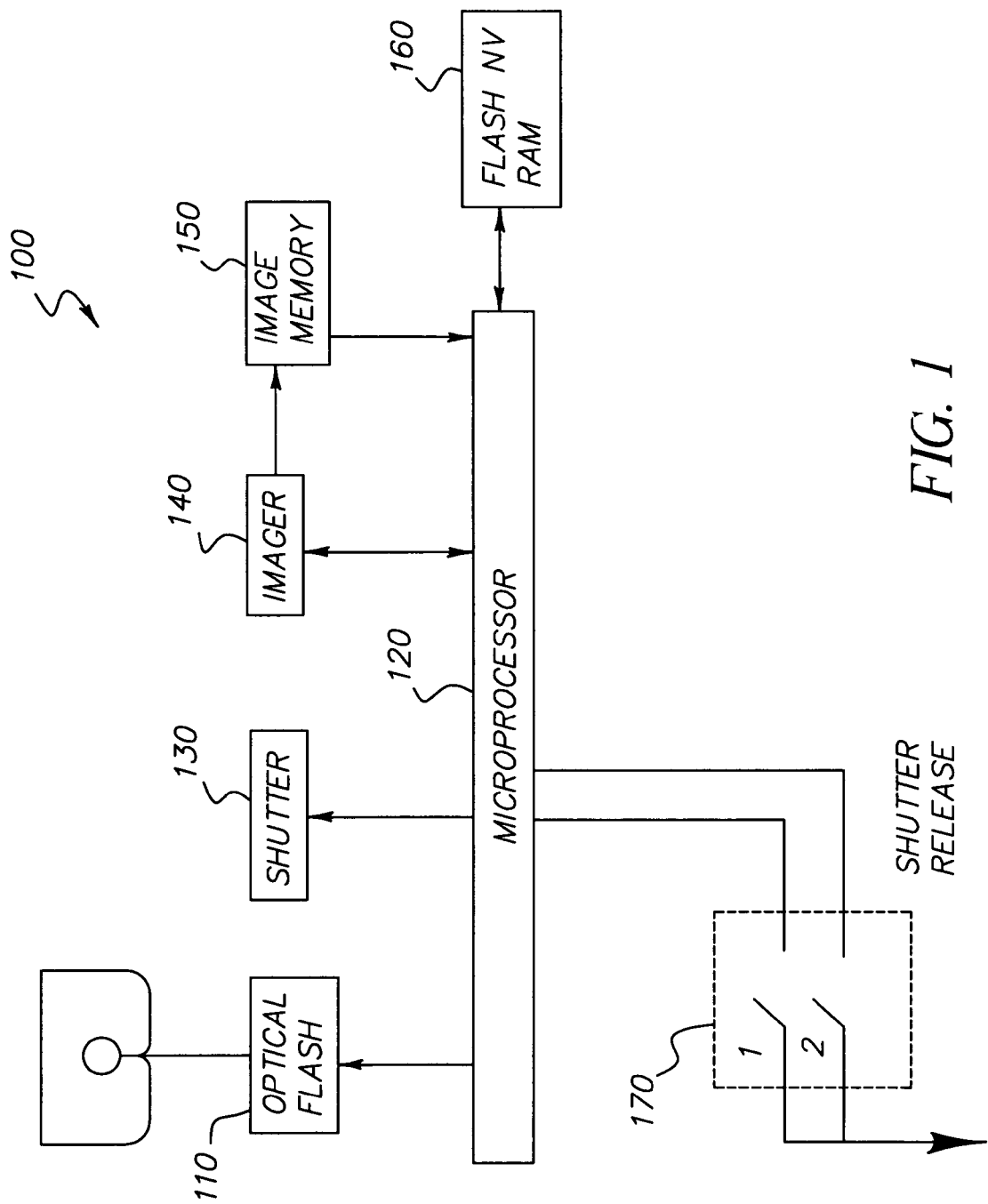
FIG. 1 is a block diagram of an exemplary camera employing the present invention.

Referring to FIG. 1, one embodiment of the present invention shows a camera system 100 having an optical flash 110, controlled by a microprocessor 120. The microprocessor 120 also controls a shutter 130, an imager 140, an image memory 150, and a flash non-volatile memory 160. A dual stage, dual contact shutter release switch 170 inputs signals to the microprocessor 120. One skilled in the art will realize that the present invention can also be implemented using a single stage, single contact shutter release switch 170.

Figure 3:
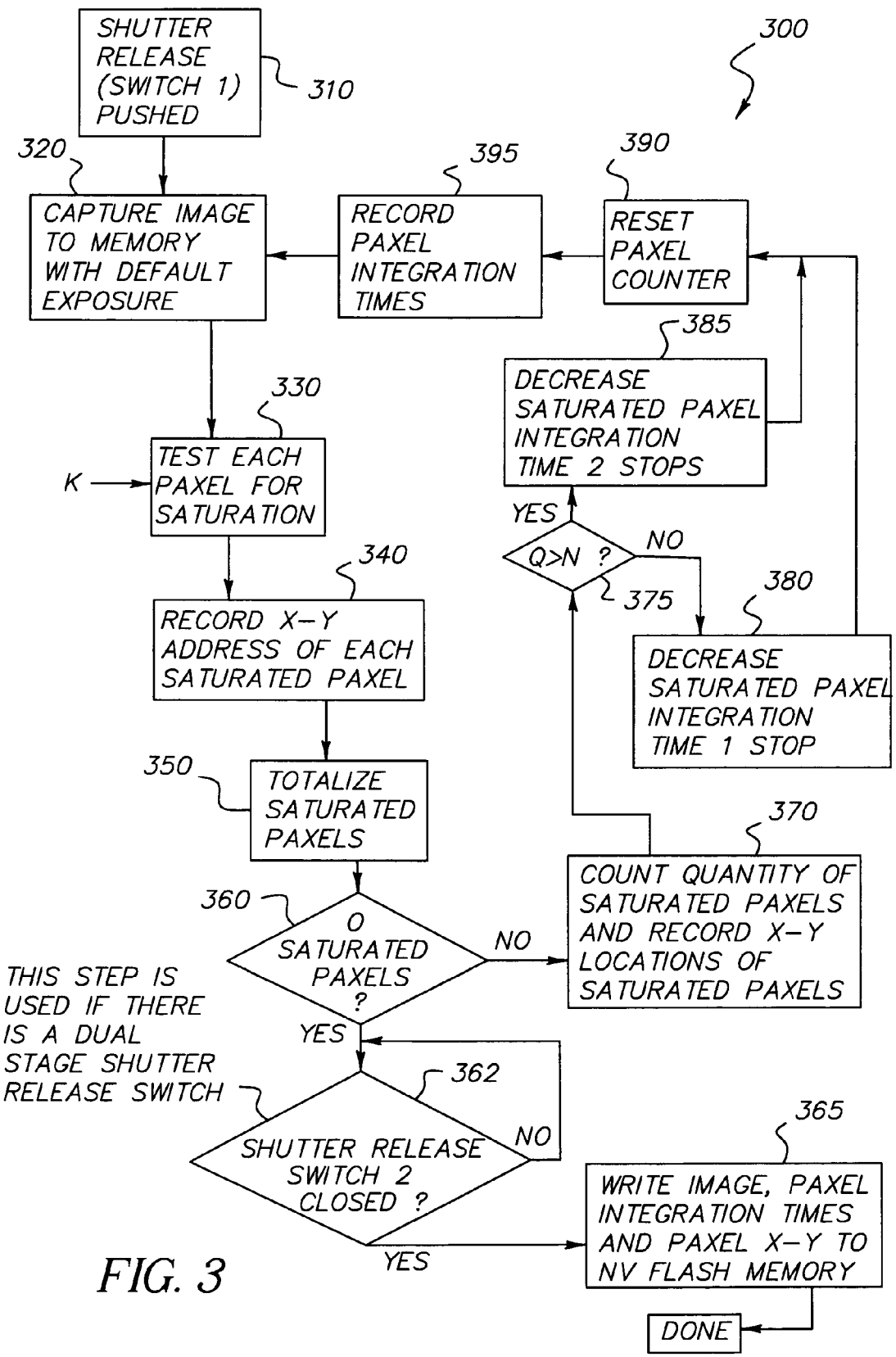
FIG. 3 is an exemplary flow chart of the paxel integration time adjusting algorithm for the present invention.

The microprocessor 120 executes a paxel integration time algorithm 300, shown in FIG. 3, that controls the relationship between the imager 140 and the image memory 150, in addition to the known functionality of the microprocessor 120 for camera system 100. In general, an image is captured from the imager 140 to the image memory 150 and the paxel integration time algorithm 300 shown in FIG. 3 determines the correct integration time for each paxel in the final image.

The imager 140 can be a CMOS imager or a CCD imager that has independent X-Y addressable integration times for groups of pixels, known as paxels. In the embodiments described herein, flash non-volatile memory 160 is used, however, one skilled in the art will recognize that EPROMs, battery-backed RAM, and fusible link ROM are some other memory options that can be substituted for use with the present invention.

Figure 2:
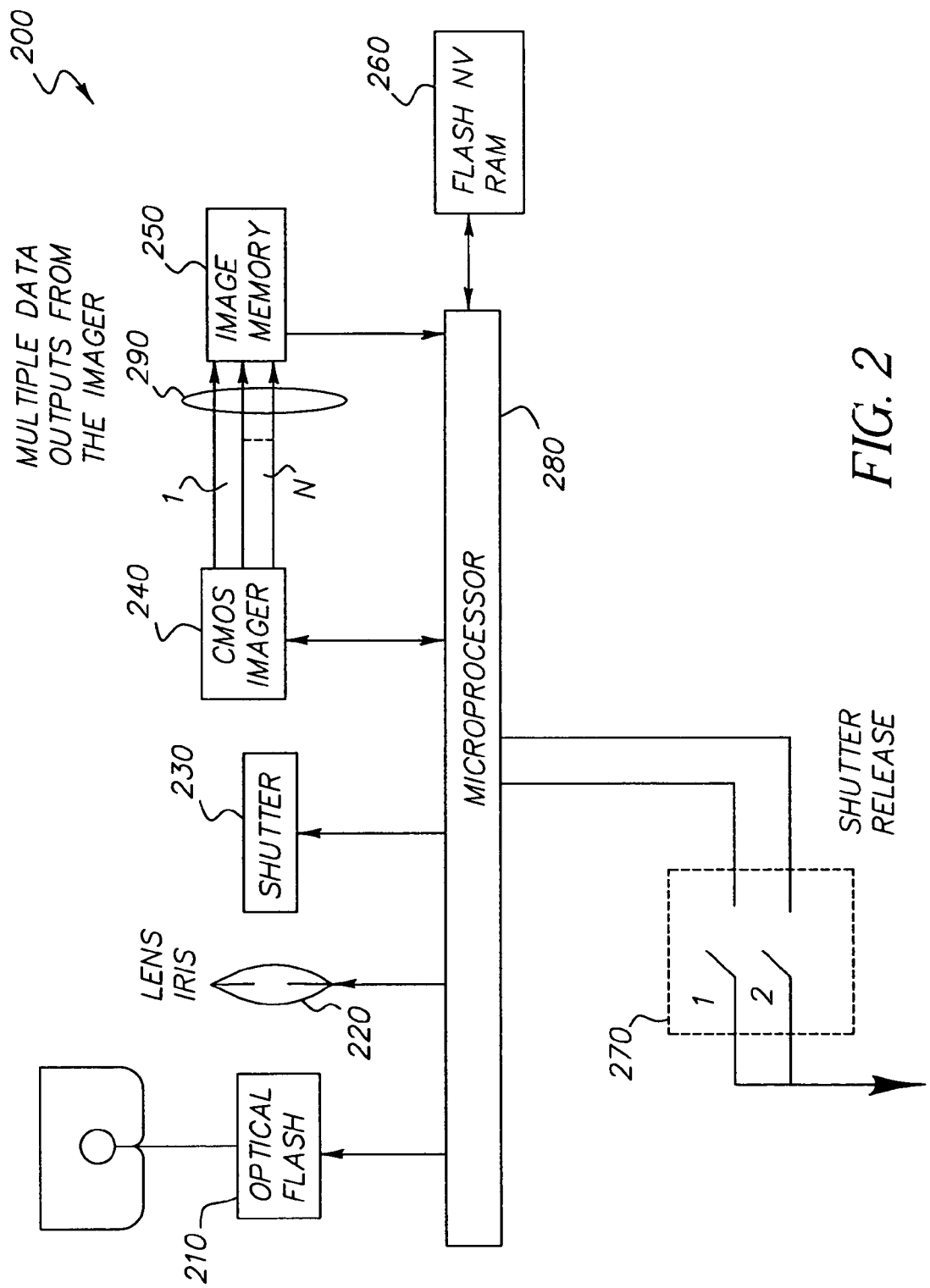
FIG. 2 is a block diagram of an exemplary electronic imaging system employing the present invention.

A second embodiment employs an electronic imaging system 200, shown in FIG. 2 (which may be an electronic still camera, a motion capture system, or a machine vision system, or any device employing imaging capabilities).

FIG. 2 illustrates that camera system 200 includes a CMOS Imager 240, with the paxel programmable integration capability. CMOS imager 240 also has multiple, parallel data signal outputs 290. These multiple, parallel data signal outputs 290 improve the CMOS imager's 240 readout rate. Consequently, the time to final picture is decreased. In all other ways the operation is the same as the first embodiment shown in FIG. 1.

Referring to FIG. 3, a paxel integration time algorithm 300 is shown for decreasing integration time of saturated paxels within an imager according to scene data from a captured image. A shutter operation 310 for operating shutter release switch 170 as shown in FIGS. 1 and 2 is used to determine the overall exposure for camera systems 100 and 200. In image capture operation 320 a first image is captured to memory 150 or 250 (according to either FIG. 1 or FIG. 2). Each paxel is tested for saturation in operation 330. All paxel values are derived by averaging the 4 pixels that make up each paxel to one value. If that value is equal to or greater than a maximum value (K) the corresponding paxel is considered to be saturated. Upon completion of operation 330, the X-Y locations of the saturated paxels are recorded in operation 340. Subsequently, the saturated paxels are totalized in operation 350. A conditional operation 360 determines that if the quantity of saturated paxels is 0, the image is written to non-volatile flash memory in operation 365. Alternatively, for conditional operation 360, if the quantity of saturated paxels is not zero, the quantity of saturated paxels is counted in operation 370. An optional conditional operation 362 is interspersed between conditional operation 360 and write operation 365 when a dual stage shutter release switch 170 or 270 is used for camera 100 or 200, respectively.

A second conditional operation, operation 375 determines if the quantity of saturated paxels is greater than a constant, N. In operation 385, the integration time of the saturated paxels is decreased a large increment (¼ the exposure time or 2 stops, in this example). One stop is a halving of the signal or a 2× reduction. Two stops is a 4× reduction in signal. A large increment is used in order to minimize the number of captures needed to acquire the correctly exposed image with greater overall dynamic range. (An aggressive reduction in integration time is used until one approaches the correct integration time. Then, a smaller incremental reduction in integration time is used for greater accuracy). If the quantity of saturated paxels is less than a constant, N, in operation 380, the integration time of the saturated paxels is decreased a lesser increment (½ the exposure time or 1 stop, in this example).

Operation 390 resets the paxel counter used at operation 350. Operation 395 records the paxel integration times. A new image is captured in operation 320 and the algorithm is repeated until the "0 saturated paxel" criteria, at operation 360, is met. The extended dynamic range image is then recorded at operation 365 along with the integration times associated with their respective paxels and the paxel X-Y location. This information is used in the image reconstruction process, albeit during post capture.

If the quantity of saturated paxels is equal to or less than a constant, N, and greater than a constant, M, the integration time of the saturated paxels is decreased a small increment (¾ the exposure time or ½ stop, in this example). A small increment is used so that the system does not severely under expose the paxels that were overexposed. If the quantity of saturated paxels is equal to or less than a constant, M, the exposure is considered correct, and the image is captured.

Both integration times are recorded since this is information that is needed for the downstream image reconstruction algorithm. The premise is that the higher the quantity of saturated paxels, the more saturated the image. A second image is captured and the process is repeated. This continues until there are no saturated paxels. The image stored in picture memory is now written to the Flash memory. The dual integration time choice enables the system to get to the correct overall exposure with a fewer number of image captures. This method can be extended to multiple decision points with multiple changes in integration time of the saturated paxels.

Figure 4A:
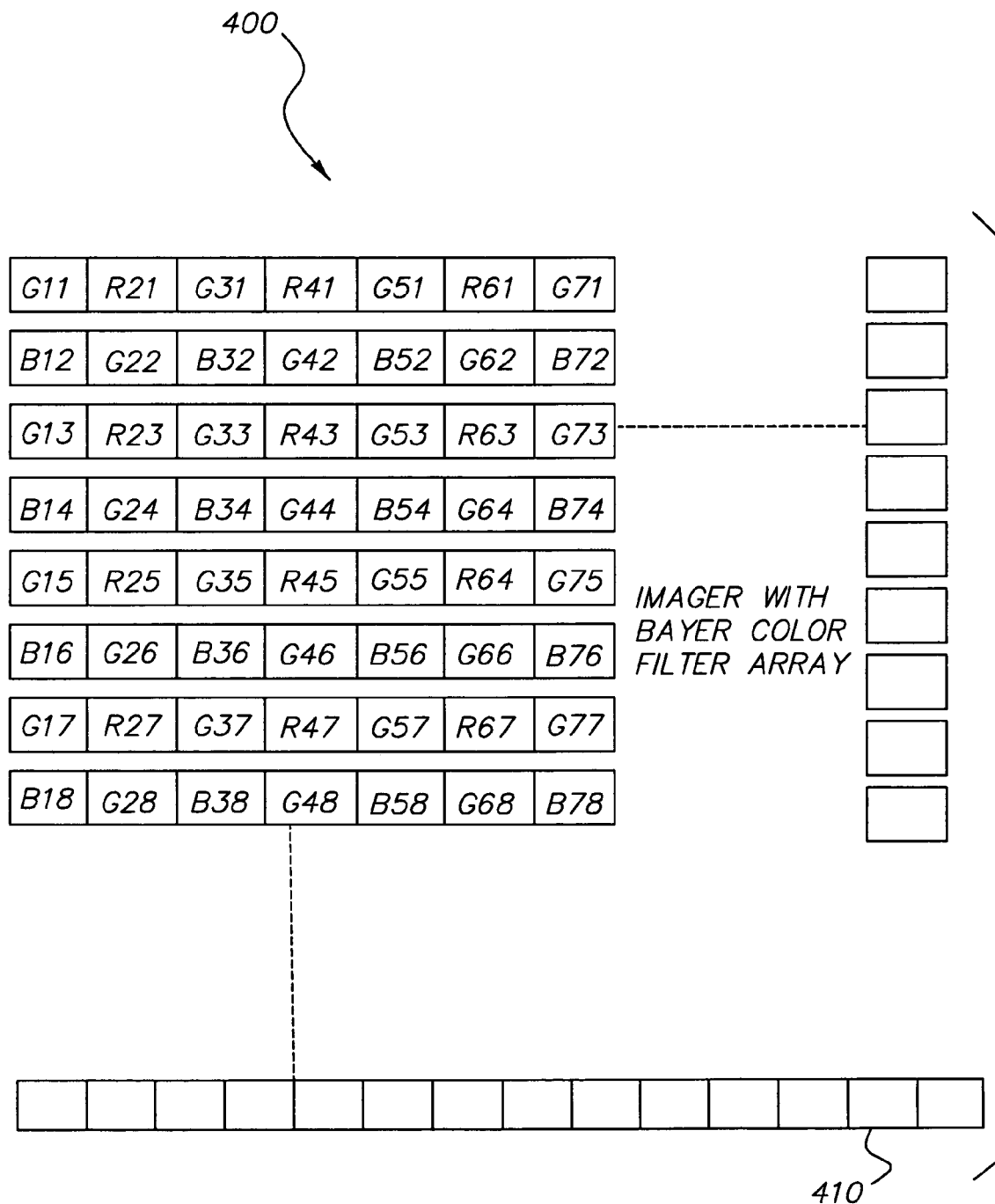
FIG. 4 is an exemplary diagram of a paxel used with the Bayer color filter array pattern according to the present invention.
Figure 4B:
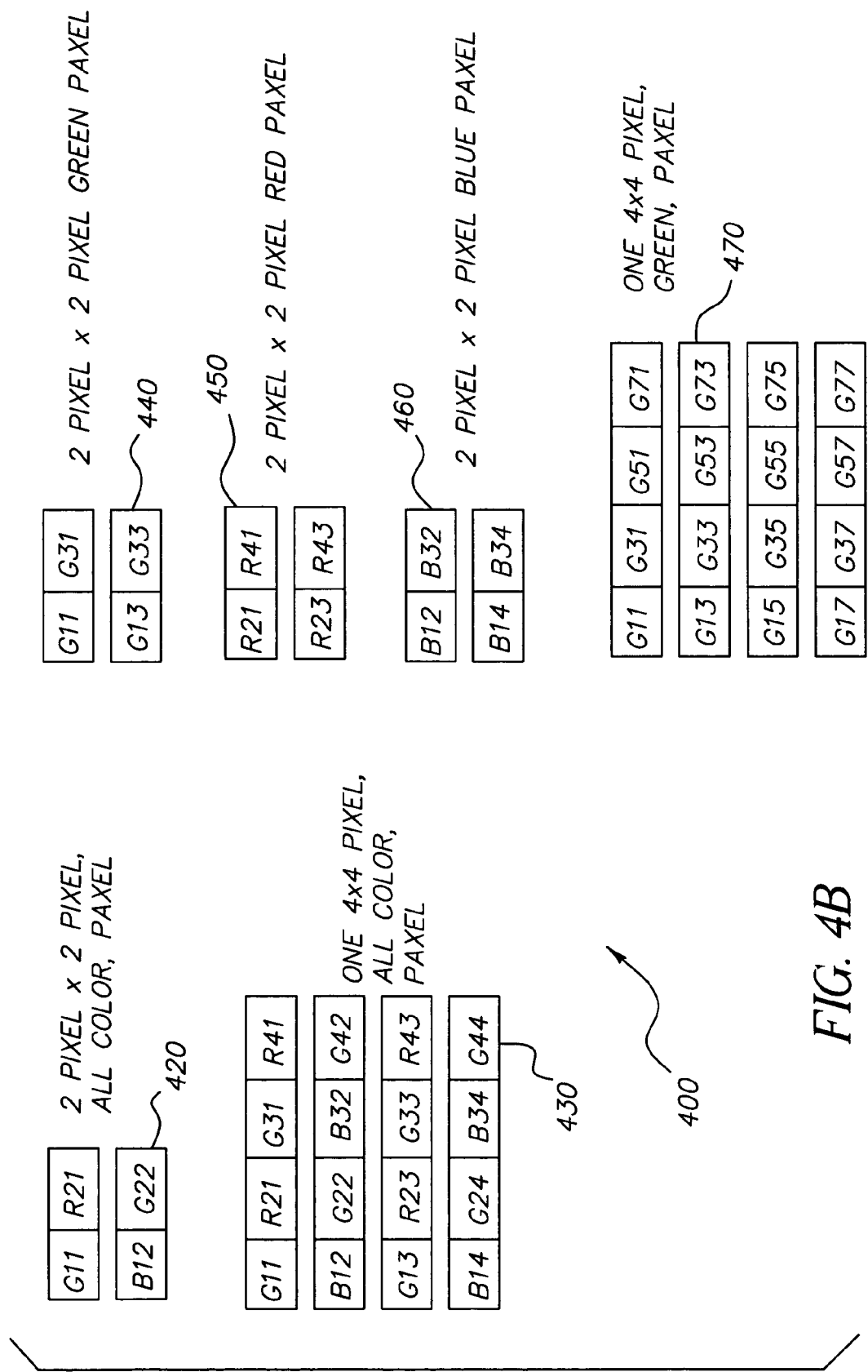

Averaging the pixels, derives each paxel, to a single value (e.g., in a 2×2 Paxel; however the paxel size can vary). Referring to FIG. 4 and paxel diagram 400, several paxel arrays are shown; for example, a 2×2 multi-color paxel 420 as well as a 4×4 multi-color paxel 430. Also shown are a 2×2 green paxel 440, a 2×2 red paxel 450, a 2×2 blue paxel 460, and a 4×4 green paxel 470. A paxel 410 used with the Bayer color filter array pattern, for implementation with an imager, is also shown.

Alternative embodiments of the present invention are contemplated. For example, in one embodiment an electronic imaging system that is running continuously and contains a CMOS Imager 240, with the paxel programmable integration capability. The electronic imaging system 200 runs continuously. When the shutter release button is pushed the first 0 saturated paxel image is stored. The time to picture capture is decreased. In all other ways it works as the earlier described embodiment.

Another embodiment is an electronic still camera imaging system 200 that uses a dual stage shutter release switch. When the first switch is closed the camera is started. This invention finds the correct integration time for the normal and saturated paxels. When the second switch is closed the first image containing no saturated paxels is then stored in non-volatile flash memory 260. This invention contains a CMOS Imager 240, with the paxel programmable integration capability. The time to picture capture is decreased.

Yet another embodiment is an imaging system 10 that contains a CMOS Imager 240, with the paxel programmable integration capability. This system uses any or all of the ideas contained in earlier embodiments. The primary purpose for this embodiment is to form the sensor for a camera exposure determination system. It can be used with film cameras or electronic cameras. This embodiment can employ sensors of low resolution and therefore, would be fast in operation and low in cost.

It is recognized that this invention will work with an imager 140 or 240 that has an electronic shutter. It is also recognized that this invention will work with imagers that require a mechanical or electromechanical shutter.

Accordingly, the invention has been described in detail with particular reference to certain preferred embodiments thereof, but it will be understood that variations and modifications can be effected within the spirit and scope of the invention.

PARTS LIST 100 camera system
110 optical flash
120 microprocessor 130 shutter
140 imager
150 image memory
160 flash non-volatile memory
170 dual stage, dual contact shutter release switch
200 electronic imaging camera system
210 optical flash
220 lens iris
230 shutter
240 CMOS imager
250 image memory
260 flash non-volatile RAM
270 dual stage, dual contact shutter release switch
280 microprocessor
290 multiple data outputs
300 flowchart
310 operation
320 operation
330 operation
340 operation
350 operation
360 operation
362 operation
365 operation
370 operation
375 operation
380 operation
385 operation
390 operation
395 operation
400 exemplary Paxel arrays
410 paxel with Bayer Color Filter Array
420 2×2 multi-color paxel
430 4×4 multi-color paxel
440 2×2 green paxel
450 2×2 red paxel
460 2×2 blue paxel
470 4×4 green paxel

What is claimed is:

1. A method for extending dynamic range of a captured image captured by an image sensor having a plurality of pixels, the method comprising the steps of:

capturing a first image using a first integration time for the plurality of pixels;

analyzing the first image on a paxel by paxel basis to locate one or more paxels having an incorrect intergration time, wherein each paxel comprises a group of pixels associated geographically with each other and the pixel values in the group of pixels for each paxel are averaged together to obtain a paxel value for each paxel;

determining an adjusted integration time for each paxel having an incorrect integration time, wherein a magnitude of an increment of adjustment for each integration time is selected to be one of at least two different increments based on a total number of paxels having incorrect integration times; and capturing a second image using a respective adjusted integration time for each paxel and using the first integration time for the remaining pixels, wherein the respective adjusted integration times are different from the first integration time.

2. The method claimed in claim 1, further comprising the step of storing an X-Y address for each paxel within the captured image.

3. The method claimed in claim 1, wherein a large total number of paxels causes a large magnitude of adjustment to at least one respective adjusted integration time.

4. The method claimed in claim 1, wherein a small total number of paxels causes a small magnitude of adjustment to at least one respective adjusted integration time.

5. The method claimed in claim 1, further comprising the step of repeatedly capturing the second image until each respective adjusted integration time is a correct integration time for each group of pixels included in each paxel.

6. The method claimed in claim 1, further comprising the steps of:

determining whether each paxel value is equal to or greater than a constant, wherein the constant represents a value at which a paxel has an incorrect integration time; and if one or more paxels has a paxel value that is equal to or greater than the constant, recording an X-Y address for each paxel having an incorrect integration time within the first image.

7. A method for extending a dynamic range of a captured image captured by an image sensor comprising a plurality of pixels, the method, comprising the steps of:

a) capturing a first image using a first integration time for the plurality of pixels;

b) analyzing the first image on a paxel by paxel basis to locate one or more paxels having an incorrect integration time, wherein each paxel comprises a group of pixels associated geographically with each other and the pixel values for the group of pixels in each paxel are averaged together to obtain a paxel value for each paxel;

c) determining whether each paxel value is equal to or greater than a first constant, wherein the first constant represents a value at which a paxel has an incorrect integration time;

d) if one or more paxels has a paxel value that is equal to or greater than the first constant, recording an X-Y address for each paxel having an incorrect integration time within the first image;

e) determining a total number of paxels having incorrect integration times in the first image;

f) comparing the total number of paxels having incorrect integration times to a second constant;

g) determining an adjusted integration time for each paxel having an incorrect integration time, wherein a magnitude of an increment of adjustment for each integration time is selected to be one of at least two different increments based on whether the total number of paxels having incorrect integration times is less than the second constant or greater than the second constant; and h) capturing a second image and varying each respective integration time of the paxels having incorrect integration times while using the first integration time for the remaining pixels.

8. The method claimed in claim 7, wherein a large total number of paxels causes a large magnitude of adjustment to at least one respective adjusted integration time.

9. The method claimed in claim 7, wherein a small total number of paxels causes a small magnitude of adjustment to at least one respective adjusted integration time.

* * * * *